United States Patent [19]

Trotter et al.

[11] Patent Number: 4,929,714

[45] Date of Patent: May 29, 1990

[54] FLEXIBLE, BIAXIALLY ORIENTED FILMS OF MODIFIED POLY (ETHYLENE TEREPHTHALATE)

[75] Inventors: Jimmy R. Trotter; Bobby J. Sublett, both of Kingsport, Tenn.

[73] Assignee: Eastman Kodak Company, Rochester, N.Y.

[21] Appl. No.: 246,045

[22] Filed: Sep. 19, 1988

[51] Int. Cl.$^5$ ............................................. C08G 63/02
[52] U.S. Cl. .............................. 528/272; 528/295.3; 528/295.5; 528/300; 528/302; 528/303; 528/304; 528/306; 528/308.6; 525/437; 264/176.1
[58] Field of Search .................. 528/272, 295.3, 295.5, 528/300, 302, 303, 304, 306, 308.6; 525/437; 264/176.1

[56] References Cited

U.S. PATENT DOCUMENTS 3,091,600 5/1963 Caldwell et al. ..................... 528/302
3,907,926 9/1975 Brown et al. ....................... 524/258

FOREIGN PATENT DOCUMENTS 1431916 4/1976 United Kingdom .

*Primary Examiner*—John Kight, III
*Assistant Examiner*—Sam A. Acquah
*Attorney, Agent, or Firm*—John F. Stevens; William P. Heath, Jr.

[57] ABSTRACT

Disclosed are flexible, biaxially oriented films of poly(ethylene terephthalate) modified with a long chain dibasic acid or glycol. This material is useful in packaging applications where resistance to flex cracking is important.

5 Claims, No Drawings

FLEXIBLE, BIAXIALLY ORIENTED FILMS OF MODIFIED POLY (ETHYLENE TEREPHTHALATE)

DESCRIPTION

1. Technical Field

This invention relates to flexible, biaxially oriented film material comPrising poly(ethylene terephthalate) sometimes referred to herein as PET modified with a long chain dibasic acid or glycol. This material is useful in packaging applications where resistance to flex cracking is important.

2. Background Information

Thin gauge oriented polypropylene and oriented nylon are currently used to package certain food items. Oriented polypropylene is used in those applications where high barrier to moisture migration is a requirement while oriented nylon is used where gas barrier (oxygen and carbon dioxide) is a requirement. Biaxially oriented PET could be used in some of these applications, but the flex cracking resistance, as measured by pinhole formation, is very poor. For example, under the test conditions of ASTM F-392, comparative samples indicate that oriented polypropylene exhibits 0 to 4 pinholes, oriented nylon 10 to 15, and oriented PET 100 to 120 pinholes. This relatively poor resistance to flex cracking of PET precludes its use in many food packaging applications.

It has now unexpectedly been found that the flex cracking resistance of poly(ethylene terephthalate) film or sheet material can be improved by modifying the polymer with a long chain dibasic acid or glycol. The film still maintains high gloss, tensile properties and barrier properties that are representative of biaxially oriented poly(ethylene terephthalate).

U.S. Pat. No. 4,636,442 discloses that a layered sheet of material with PET on both sides, using a tie layer of a polyesterether, has improved resistance to flex cracking.

U.S. Pat. No. 4,439,598 relates to poly(tetramethylene terephthalate) modified with an aliphatic dicarboxylic acid and either dimer acid or dimer glycol.

U.S. Pat. No. 3,915,913 relates to polymer blends which include a copolyester derived from a glycol having 2-10 carbons, terephthalic acid and dimer acid.

U.S. Pat. No. 4,195,000 relates to copolyester of a polymethylene glycol, dimeric fatty acid and an aromatic fatty acid.

Also of interest are U.S. Pat. Nos. 3,235,520; 3,383,343; 4,045,431; 4,086,212; 4,107,149; and 4,136,089.

DISCLOSURE OF THE INVENTION

According to the present invention, there is provided a flexible, biaxially oriented film having a thickness of about 0.5 to about 5 mils and improved resistance to flex cracking, said film comprising a copolyester having an I.V. of at least 0.6 and repeat units from terephthalic acid, ethylene glycol and (a) or (b) or a combination of (a) and (b) as follows:

(a) repeating units from a dibasic acid having a molecular weight of about 200–600 in an amount of about 2-20 mole % based on 200 mole % for carboxyl and hydroxyl moieties;

(b) repeat units from a glycol having a molecular weight of 200–6,000 in an amount of 2 –20% based on polymer weight, the total of (a) and (b) not exceeding about 20%.

The dibasic acid component and the glycol component of the copolyesters used herein may contain minor amounts (i.e., up to about 10 mol %) of acids and/or glycols other than the terephthalic acid, ethylene glycol and long chain acid or glycol specified herein. The copolymer may contain minor amounts of monomer units of diethylene glycol; propane 1,3-diol; butane-1,4-diol; 1,4-cyclohexanedimethanol; neopentyl glycol and the like substituted for the glycol moiety in the preparation of the copolymer or isophthalic; dibenzoic, naphthalene 1,4- or 2,6-dicarboxylic; adipic; sebacic; diglycolic; and the like substituted for the acid moiety in the preparation of the copolymer.

In addition, the modified poly(ethylene terephthalate) polymer can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments. This polyester may be prepared by conventional techniques such as described in U.S. Pat. No. 4,010,145 incorporated herein by reference.

The modified poly(ethylene terephthalate) is formed into a thin layer or sheet, which may be produced by conventional extrusion methods well known to those skilled in the art. The I.V. of the sheet is at least 0.6, preferably at least 0.8.

The copolyesters used in the preparation of the films contain long chain flexible links in the polymer chain. The flexible linkages in the polymer chain can be obtained by the use of long chain dibasic saturated acids or glycols having molecular weights of 200 to 6000. Suitable dibasic acids and glycols include 1,12-dodecanedioic acid, dimer acid, polyethylene glycols, polypropylene glycols, polytetramethylene glycol and polyethylenepolypropylene block glycols. Many of these are commercially available under trademarks such as EMPOL 1010 dimer acid and CARBOWAX polyethylene glycol.

The films of this invention may be prepared by extruding the copolyesters into 18 to 20 mil films with a conventional extruder, such as a Barbender Extruder. The 18 to 20 mil films are then biaxially oriented 4X by 4X using a conventional biaxial orientation apparatus such as a T. M. Long Machine. Flex crack resistances of the films are determined according to ASTM F-392 using a Gelbo Flex Tester, wherein numerical values represent number of pinholes. Tensile film properties are determined according to ASTM D-882. Oxygen transmission rates are determined using a Modern Controls Corporation OX-TRAN 100 series instrument.

EXAMPLE 1 (Control)

Poly(ethylene terephthalate) with an I.V. of 0.705 is extruded into 20 mil film (film I.V.=0.658). The film is then biaxially oriented 4X by 4X on a T. M. Long Machine at 100° C. The oriented film has the properties that are listed in Table 1. The projection shows that films of this polymer have poorflex crack resistance, i.e., 43 pinholes after flexing 30 minutes. Oriented films of a poly(ethylene terephthalate) with a film I.V. of 0.727 also have poor flex crack resistance, and film failure occurs after flexing 30 minutes.

EXAMPLE 2

About 140.36 grams (0.7235 moles) of dimethyl terephthalate. 87.17 grams (1.406 moles) of ethylene glycol, 15.0 grams (0.025 moles) of Carbowax 600 polyethylene glycol (molecular weight=600), 0.30 grams (0.2 weight %) of Irganox 1010 antioxidant, and conventional polyesterification catalyst are weighed into a 500 mL round-bottom flask equipped with a nitrogen inlet, a stirrer, a vacuum outlet, and a condensing flask. The flask is heated to 200° to 210° C. in a Belmont metal bath for two hours with a nitrogen sweep over the reaction mixture. When the theoretical amount of methanol has distilled from the reaction mixture, the metal bath temperature is increased to 280° C. and the pressure in the flask is reduced to about 0.1 mm of mercury. The flask is heated at 280° C. at reduced pressure for about 90 minutes. The flask is then removed from the metal bath and is allowed to cool under a nitrogen atmosphere as the polymer solidifies. NMR analysis indicates that the polymer is a poly(ethylene terephthalate) copolyester modified with 9 weight % of the Carbowax 600 polyethylene glycol moiety. The copolyester has an I.V. value of 0.73. The copolyester is ground to less than 3 mm and then built-up in the solid phase at 220° C. to an I.V. value of 0.95.

The copolymer is extruded into 20-mil film. This film is then biaxially oriented 4X by 4X on a T. M. Long Machine at 85° C. The films have an I.V. value of 0.838. Table 1 contains the properties that are obtained on these oriented films. The table shows that oriented films of this copolymer have good flex crack resistance, i.e., 12 pinholes after flexing 30 minutes. Heat set films (180° C. for 2 minutes) of this copolymer also have good flex crack resistance (5 pinholes after flexing for 30 minutes).

EXAMPLE 3

The general procedure of Example 2 is repeated to prepare a poly(ethylene terephthalate) copolymer modified with 5 weight % of the Carbowax 600 polyethylene glycol moiety. Oriented films of the copolymer have an I.V. value of 0.825 and the properties listed in Table 1. The properties in Table 1 show that the oriented films of this copolymer have good flex crack resistance. Oriented films of this copolymer composition that have a film I.V. of 0.665 have poor flex crack resistance (44 pinholes after flexing 30 minutes).

EXAMPLE 4

The general procedure of Example 2 is repeated in the preparation of a poly(ethylene terephthalate) copolymer modified with 10 weight % of the Carbowax 1540 polyethylene glycol (M.W.=1500) moiety. Oriented films of this copolymer have an I.V. value of 0.870. Properties of these films are listed in Table 1. The properties in Table 1 show that the oriented films of this copolymer have good flex crack resistance.

EXAMPLE 5

The general procedure of Example 2 is repeated in the preparation of a poly(ethylene terephthalate) copolymer modified with 10 mole % of the Empol 1010 dimer acid (MW=600) moiety. Oriented films of this copolymer have an I.V. value of 0.59. Properties of these films are listed in Table 1. The properties show that although the films have a relatively low I.V., they have dimer acid portion of a high level of flexibility so that the films of the copolymer have good flex crack resistance.

EXAMPLE 6

The general procedure of Example 2 is repeated in the preparation of a poly(ethylene terephthalate) copolymer modified with 5 mole % of the Empol 1010 dimer acid moiety. Oriented films of the copolymer have an I.V. value of 0.784. Properties of these films are listed in Table 1. The properties show that the oriented films have good flex crack resistance.

EXAMPLE 7

The general procedure of Example 2 is repeated in the preparation of a poly(ethylene terephthalate) copolymer modified with 15 mole % of 1,12-dodecanedioic acid (M.W.=240) moiety. Oriented films of the copolymer have an I.V. value of 0.78. Properties of these films are listed in Table 1. The properties show that the oriented films have good flex crack resistance. Oriented films of this composition that have a film I.V. value of 0.56 have poor flex crack resistance (64 pinholes after flexing for 30 minutes).

EXAMPLE 8 (Control)

The general procedure of Example 2 is repeated in the preparation of a poly(ethylene terephthalate) copolymer modified with 20 mole % of glutaric acid (M.W.=132) moiety. Oriented films of the copolymer have an I.V. value of 0.772. Properties of these films are listed in Table 1. The properties show that these films have poor flex crack resistance. The poor flex crack resistance is attributed to the relatively low molecular weight of the glutaric acid link in the polymer chain.

EXAMPLE 9 (Control)

The general procedure of Example 2 is repeated in the preparation of a poly(ethylene terephthalate) copolymer modified with 18 mol % of diethylene glycol (M.W.=106) moiety. Oriented films of the copolymer have an I.V. value of 0.68. Properties of these films are listed in Table 1. The properties show that these films developed a large number of pinholes after flexing 30 minutes.

TABLE 1

| Example Number | Properties of Oriented Films | | | | | | | | |
| --- | --- | --- | --- | --- | --- | --- | --- | --- | --- |
|  | 1 | 2 | 3 | 4 | 5 | 6 | 7 | 8 | 9 |
| Film IV | 0.658 | 0.838 | 0.825 | 0.870 | 0.59 | 0.784 | 0.78 | 0.772 | 0.68 |
| Film Thickness, Mils | 1.25 | 1.0 | 1.2 | 1.2 | 1.2 | 1.2 | 1.2 | 1.2 | 1.0 |
| 02 Transmission Rate, cc-mil/100 sq in- 24 hr - atm | 6.31 | 7.903 | 6.89 | 9.62 | — | 19.55 | 14.68 | 7.441 | 7.60 |
| Tensile Film Properties (ASTM D882) | | | | | | | | | |
| Tangent Modulus, 10**5 psi | 5.79 | 4.62 | 4.84 | 4.44 | 1.38 | 3.62 | 3.31 | 3.26 | 3.58 |

TABLE 1-continued

| Example Number | Properties of Oriented Films | | | | | | | | |
|---|---|---|---|---|---|---|---|---|---|
| | 1 | 2 | 3 | 4 | 5 | 6 | 7 | 8 | 9 |
| Yield Stress, 10**3 psi | 10.2 | 12.20 | 12.20 | 10.35 | 4.68 | 8.70 | 8.16 | 6.41 | 8.33 |
| Break Elogation, % | 93 | 80 | 96 | 115 | 159 | 129 | 192 | 236 | 162 |
| Tensile Strength, 10**3 psi | 34.5 | 20.17 | 33.68 | 33.12 | 15.44 | 28.61 | 17.21 | 6.61 | 13.58 |
| Flex Crack Resistance | | | | | | | | | |
| Number of Pinholes Flex Time, 30 min. | 43 | 12 | 23 | 17 | 0 | 2 | 7 | 66 | 36 |

Where terephthalic acids is specified herein in the formation of the copolyesters, it should be understood that ester forming derivatives of the acids may be used rather than the acids themselves as is conventional practice. For example, dimethyl terephthalate may be used rather than terephthalic acid.

As used herein, the inherent viscosity (I.V.) is measured at 25° C. using 0.50 gram of copolyester per 100 mL of a solvent consisting of 60 percent by weight phenol and 40 percent by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. The method of rendering a polymer having an I.V. of at least 0.6 and repeat units from terephthalic acid and ethylene glycol resistant to flex cracking when in the form of a biaxially oriented film having a thickness of about 0.5–5 mils comprising copolymerizing therewith a monomer having (a) or (b) or a combination of (a) and (b) as follows:
   (a) repeat units from a dibasic acid having a molecular weight of about 200–600 in an amount of about 2–20 mole % based on 200 mole % for carboxyl and hydroxyl moieties;
   (b) repeat units from a glycol having a molecular weight of about 200–6,000 in an amount of 2–20 percent based on polymer weight, the total of (a) and (b) not exceeding about 20%.

2. The method according to claim 1 wherein said copolyester has repeat units from terephthalic acid, ethylene glycol and a dibasic acid having a molecular weight of about 200–600 in an amount of about 2–20 mole % based on 200 mole % for carboxyl and hydroxyl moieties.

3. The method according to claim 1 wherein said copolyester has repeat units from terephthalic acid, ethylene glycol and a glycol having a molecular weight of about 200–6,000 in an amount of about 2–20 percent based on polymer weight.

4. The method according to claim 1 wherein said copolyester has repeat units from terephthalic acid, ethylene glycol and a combination of (a) a dibasic acid having a molecular weight of about 200–600 in an amount of about 2–20 mole % based on 200 mole % for carboxyl and hydroxyl moieties and (b) a glycol having a molecular weight of about 200–6,000 in an amount of about 2–20 percent based on polymer weight.

5. The method according to claim 1 wherein said monomer is selected from the group consisting of 1,12-dodecanedioic acid, dimer acid, polyethylene glycols, polypropylene glycols, polytetramethylene glycol and polyethylenepolypropylene block glycols.

* * * * *